US008036888B2

(12) United States Patent
Matsuo

(10) Patent No.: US 8,036,888 B2

(45) Date of Patent: Oct. 11, 2011

(54) COLLECTING SOUND DEVICE WITH DIRECTIONALITY, COLLECTING SOUND METHOD WITH DIRECTIONALITY AND MEMORY PRODUCT

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1298 days.

(21) Appl. No.: 11/519,792

(22) Filed: Sep. 13, 2006

(65) Prior Publication Data

US 2007/0274536 A1 Nov. 29, 2007

(30) Foreign Application Priority Data

May 26, 2006 (JP) ................................ 2006-147043

(51) Int. Cl.
*G10L 15/20* (2006.01)

(52) U.S. Cl. ........ 704/233; 704/231; 704/246; 704/238; 700/245

(58) Field of Classification Search .................. 704/233, 704/227, 226; 381/94.3, 92; 379/388.06
See application file for complete search history.

(56) References Cited

U.S. PATENT DOCUMENTS 5,335,312 A * 8/1994 Mekata et al. ................ 704/202
5,539,859 A * 7/1996 Robbe et al. .................. 704/233
5,574,824 A * 11/1996 Slyh et al. ..................... 704/226
6,009,396 A 12/1999 Nagata .......................... 704/270
6,130,949 A * 10/2000 Aoki et al. ................... 381/94.3
6,707,910 B1 * 3/2004 Valve et al. .............. 379/388.06
7,031,474 B1 * 4/2006 Yuen et al. ........................ 381/1
7,039,199 B2 * 5/2006 Rui ................................ 381/92
7,209,567 B1 * 4/2007 Kozel et al. .................. 381/94.3
7,415,117 B2 * 8/2008 Tashev et al. ................... 381/92
7,454,332 B2 * 11/2008 Koishida et al. .............. 704/227
7,454,335 B2 * 11/2008 Gao et al. ...................... 704/233
2007/0003074 A1 * 1/2007 Ruwisch ......................... 381/92

FOREIGN PATENT DOCUMENTS

DE 697 13 647 9/1997

(Continued)

OTHER PUBLICATIONS

Communication from German Patent Office dated May 31, 2007 with English translation (5 pages).

(Continued)

*Primary Examiner* — Richemond Dorvil
*Assistant Examiner* — Mark Villena
(74) *Attorney, Agent, or Firm* — Kratz, Quintos & Hanson, LLP

(57) ABSTRACT

A sound input from sound sources existing in a plurality of directions is accepted and converted into a signal on a frequency axis. A suppressing function to suppress the converted signal on a frequency axis is computed, an amplitude component of a signal on a frequency axis is multiplied by the computed suppressing function and the converted signal on a frequency axis is corrected. A phase component of each converted signal on a frequency axis is computed for each frequency and a difference of phase components is computed. A probability value indicative of probability of existence of a sound source in a predetermined direction is specified based on the computed difference and a suppressing function to suppress a sound input from a sound source other than a sound source in a predetermined direction is computed based on the specified probability value.

7 Claims, 6 Drawing Sheets

FOREIGN PATENT DOCUMENTS

| | | | |
|---|---|---|---|
| DE | 697 32 329 | | 1/2005 |
| EP | 0 901 267 | | 3/1999 |
| EP | 1065909 | A | 1/2001 |
| JP | 5-22787 | | 1/1993 |
| JP | 6-204771 | | 7/1994 |
| JP | 10-313497 | | 11/1998 |
| JP | 2001-45592 | | 2/2001 |
| JP | 2001-166025 | | 6/2001 |

OTHER PUBLICATIONS

Thomas M. Sulllivan: "Multi-Microphone Correlation-Based Processing for Robust Automatic Speech Recognition," Department of Electrical and Computer Engineering, Carnegie Mellon University, Pittsburgh, PA, Aug. 1996 (pp. 1-113).

Office Action dated May 10, 2011 corresponding to Japanese Patent Application No. 2006-147043 with English translation and Certification of translation.

* cited by examiner

COLLECTING SOUND DEVICE WITH DIRECTIONALITY, COLLECTING SOUND METHOD WITH DIRECTIONALITY AND MEMORY PRODUCT

CROSS-REFERENCE TO RELATED APPLICATIONS

This Nonprovisional application claims priority under 35 U.S.C. §119(a) on Patent Application No. 2006-147043 filed in Japan on May 26, 2006, the entire contents of which are hereby incorporated by reference.

BACKGROUND OF THE INVENTION

The present invention relates to a collecting sound device with directionality, a collecting sound method with directionality and a memory product having a computer program recorded thereon, which can enhance a voice signal generated from a sound source in a predetermined direction and suppress noises including ambient voices when voice signals including voices, noises and the like from sound sources existing in a plurality of directions are inputted.

With the progress of computer technology in recent years, the accuracy of voice recognition has been rapidly improved. A great number of sound collecting devices have been developed for specifying the direction of a needed sound source in order to identify a needed voice from voices generated from sound sources existing in a plurality of directions and suppressing voices and the like generated from sound sources existing in other directions as noises in sound processing.

For example, in a sound source separating method disclosed in Japanese Patent Application Laid-Open No. 10-313497 (1998), the arrival time interval of an input signal of each of microphones composing an array is detected on a frequency axis so as to see from which sound source an arrived sound comes from and separate the frequency component of the sound spectrum. Conventional noise suppressing methods for separating an aimed voice signal, which can be implemented on a time axis or a frequency axis, are classified broadly into two systems of a synchronous addition system and a synchronous subtraction system.

In a synchronous addition system, a synchronous process and an addition process fitted to an aimed direction are performed for voice signals inputted from a plurality of microphones. An aimed voice signal is enhanced by the addition process and noises including the other voice signals can be suppressed in comparison. In the meantime, in a synchronous subtraction system, a synchronous process and a subtraction process fitted to directions in which sound sources other than an aimed sound source exist are performed for voice signals inputted from a plurality of microphones, so that noises including voice signals other than an aimed voice signal can be suppressed directly.

BRIEF SUMMARY OF THE INVENTION

The present invention has been made in view of the circumstances, and it is an object thereof to provide a collecting sound device with directionality, a collecting sound method with directionality and a memory product having a computer program recorded thereon, which can enhance a voice signal generated from a sound source in a predetermined direction and suppress ambient noises when voice signals including voices, noises and the like from sound sources existing in a plurality of directions are inputted, with a simple structure without the need to set up a number of microphones.

In order to achieve the above object, a collecting sound device with directionality according to the first invention is characterized by comprising: a plurality of voice accepting means for accepting a sound input from sound sources existing in a plurality of directions and converting the sound input into a signal on a time axis; signal converting means for converting each signal on a time axis into a signal on a frequency axis; phase component computing means for computing a phase component of each signal on a frequency axis converted by the signal converting means for each frequency; phase difference computing means for computing a difference of phase components between signals on a frequency axis computed by the phase component computing means; probability value specifying means for specifying a probability value indicative of probability of existence of a sound source in a predetermined direction based on the difference of phase components computed by the phase difference computing means; suppressing function computing means for computing a suppressing function to suppress a sound input from a sound source other than a sound source in a predetermined direction based on the probability value specified by the probability value specifying means; signal correcting means for multiplying an amplitude component of a signal on a frequency axis by the computed suppressing function and correcting the converted signal on a frequency axis; and signal restoring means for restoring the corrected signal on a frequency axis to a signal on a time axis.

The second invention relates to a collecting sound device with directionality according to the first invention, characterized by further comprising means for determining whether the difference of phase components computed by the phase difference computing means is within a predetermined range or not, wherein the suppressing function is set to 1 in a phase width for which it is determined that the difference of phase components is within a predetermined range.

The third invention relates to a collecting sound device with directionality according to the second invention, characterized by further comprising means for computing a separation phase width corresponding to a range of a phase component, for which a sound input from a sound source other than a sound source in a predetermined direction needs to be suppressed, based on the probability value specified by the probability value specifying means, wherein the suppressing function is set to 1 in the phase width and set as a positive real number which gradually decreases with distance from the phase width and becomes 0 in a range beyond the computed separation phase width.

A collecting sound method with directionality according to the fourth invention is characterized by comprising the steps of accepting a sound input from sound sources existing in a plurality of directions; converting the sound input into a signal on a time axis; converting each signal on a time axis into a signal on a frequency axis; computing a phase component of each converted signal on a frequency axis for each frequency; computing a difference of computed phase components between signals on a frequency axis; specifying a probability value indicative of probability of existence of a sound source in a predetermined direction based on the computed difference of phase components; computing a suppressing function to suppress a sound input from a sound source other than a sound source in a predetermined direction based on the specified probability value; multiplying an amplitude component of a signal on a frequency axis by the computed suppressing function and correcting the converted signal on a frequency axis; and restoring the corrected signal on a frequency axis to a signal on a time axis.

The fifth invention relates to a collecting sound method with directionality according to the fourth invention, characterized by further comprising the steps of determining whether the computed difference of phase components is within a predetermined range or not; and setting the suppressing function to 1 in a phase width for which it is determined that the difference of phase components is within a predetermined range.

The sixth invention relates to a collecting sound method with directionality according to the fifth invention, characterized by further comprising the steps of computing a separation phase width corresponding to a range of a phase component, for which a sound input from a sound source other than a sound source in a predetermined direction needs to be suppressed, based on the specified probability value; and setting the suppressing function to 1 in the phase width and setting the suppressing function as a positive real number which gradually decreases with distance from the phase width and becomes 0 in a range beyond the computed separation phase width.

A memory product having a computer program recorded thereon according to the seventh invention is characterized in that the computer program comprises the steps of: causing a computer to accept a sound input from sound sources existing in a plurality of directions; causing a computer to convert the sound input into a signal on a time axis; causing a computer to convert each signal on a time axis into a signal on a frequency axis; causing a computer to compute a phase component of each converted signal on a frequency axis for each frequency; causing a computer to compute a difference of computed phase components between signals on a frequency axis; causing a computer to specify a probability value indicative of probability of existence of a sound source in a predetermined direction based on the computed difference of phase components; causing a computer to compute a suppressing function to suppress a sound input from a sound source other than a sound source in a predetermined direction based on the specified probability value; causing a computer to multiply an amplitude component of a signal on a frequency axis by the computed suppressing function and correct the converted signal on a frequency axis; and causing a computer to restore the corrected signal on a frequency axis to a signal on a time axis; and causing a computer to suppress a sound input from a sound source other than a sound source in a predetermined direction.

The eighth invention relates to a memory product having a computer program recorded thereon according to the seventh invention, characterized in that the computer program further comprises the steps of causing a computer to determine whether the computed difference of phase components is within a predetermined range or not; and causing a computer to set the suppressing function to 1 in a phase width for which it is determined that the difference of phase components is within a predetermined range.

The ninth invention relates to a memory product having a computer program recorded thereon according to the eighth invention, characterized in that the computer program further comprises the steps of causing a computer to compute a separation phase width corresponding to a range of a phase component, for which a sound input from a sound source other than a sound source in a predetermined direction needs to be suppressed, based on the specified probability value; and causing a computer to set the suppressing function to 1 in the phase width and set the suppressing function as a positive real number which gradually decreases with distance from the phase width and becomes 0 in a range beyond the computed separation phase width.

In the first invention, the fourth invention and the seventh invention, a sound input from sound sources existing in a plurality of directions is accepted and converted into a signal on a time axis, each signal on a time axis is converted into a signal on a frequency axis and a suppressing function to suppress the converted signal on a frequency axis is computed. An amplitude component of a signal on a frequency axis is multiplied by the computed suppressing function, the converted signal on a frequency axis is corrected, the corrected signal on a frequency axis is restored to a signal on a time axis and a sound input from a sound source other than a sound source in a predetermined direction is suppressed. A phase component of each converted signal on a frequency axis is computed for each frequency, a difference of computed phase components is computed and a probability value indicative of probability of existence of a sound source in a predetermined direction is specified based on the computed difference of phase components between signals on a frequency axis. A suppressing function to suppress a sound input from a sound source other than a sound source in a predetermined direction is computed based on the specified probability value. In this manner, when a plurality of sound sources exist, it becomes possible to enhance only a voice generated from a sound source existing in a predetermined direction and realize precise voice recognition even if amplitude components are superposed in a frequency band.

In the second invention, the fifth invention and the eighth invention, determined is whether the computed difference of phase components is within a predetermined range or not and the suppressing function is set to 1 in a phase width for which it is determined that the difference of phase components is within a predetermined range. In this manner, it becomes possible to set a direction for which the difference of phase components is within a predetermined range as a direction in which a sound source exists, reduce a spectrum value for a direction other than the set direction in which the sound source exists, enhance only a voice generated from a sound source existing in a predetermined direction in comparison and realize precise voice recognition.

In the third invention, the sixth invention and the ninth invention, a separation phase width corresponding to a range of a phase component, for which a sound input from a sound source other than a sound source in a predetermined direction needs to be suppressed, is computed based on the specified probability value, the suppressing function is set to 1 in the phase width and the suppressing function is set as a positive real number which gradually decreases with distance from the phase width and becomes 0 in a range beyond the computed separation phase width. In this manner, it becomes possible to reduce an amplitude component (amplitude spectrum value) for a direction other than a direction in which the sound source exists, enhance only a voice generated from a sound source existing in a predetermined direction in comparison and realize precise voice recognition.

With the first invention, the fourth invention or the seventh invention, when a plurality of sound sources exist, it becomes possible to enhance only a voice generated from a sound source existing in a predetermined direction and realize precise voice recognition even if amplitude components are superposed in a frequency band.

With the second invention, the fifth invention and the eighth invention, it becomes possible to set a direction, for which the difference of phase components is within a predetermined range, as a direction in which the sound source exists, reduce a spectrum value for a direction other than the set direction in which the sound source exists, enhance only a voice generated from a sound source existing in a predetermined direction in comparison and realize precise voice recognition.

With the third invention, the sixth invention and the ninth invention, it becomes possible to reduce an amplitude component (amplitude spectrum value) for a direction other than a direction in which the sound source exists, enhance only a voice generated from a sound source existing in a predetermined direction in comparison and realize precise voice recognition.

The above and further objects and features of the invention will more fully be apparent from the following detailed description with accompanying drawings.

DETAILED DESCRIPTION OF THE INVENTION

In the conventional voice input method mentioned above, a frequency component of a spectrum is separated in order to see in which direction a sound source of a voice signal exists. Consequently, the method is based on the assumption that the cross-correlation between voice signals coming from a plurality of sound sources is small, that is, there is hardly any superposition part on the spectrum. However, there is a problem that precise separation of a frequency component is difficult since generally a superposition part is generated on the spectrum.

In addition, in the synchronous subtraction system, it is necessary to set up a microphone array provided with microphones the number of which corresponds to the number of sound sources. In the meantime, the synchronous addition system also has a problem that miniaturization, weight saving and the like of the device are difficult since a number of microphones must be provided practically.

The present invention has been made in view of the circumstances, and it is an object thereof to provide a collecting sound device with directionality, a collecting sound method with directionality and a memory product having a computer program recorded thereon, which can enhance a voice signal generated from a sound source in a predetermined direction and suppress ambient noises when voice signals including voices, noises and the like from sound sources existing in a plurality of directions are inputted, with a simple structure without the need to set up a number of microphones. The following description will explain the present invention in detail with reference to the drawings illustrating an embodiment thereof.

Figure 1:
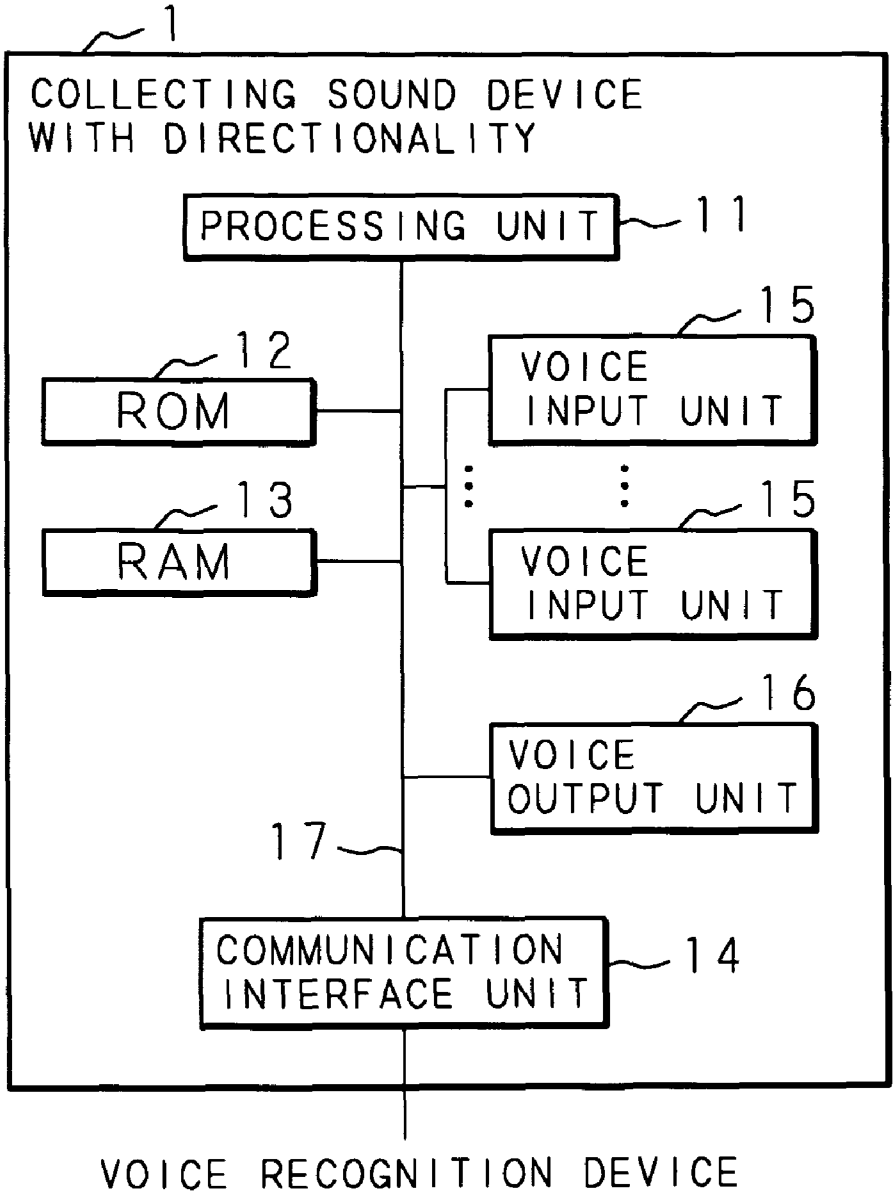
FIG. 1 is a block diagram showing the structure of a computer for embodying a collecting sound device with directionality according to an embodiment of the present invention.

FIG. 1 is a block diagram showing the structure of a computer for embodying a collecting sound device with directionality 1 according to an embodiment of the present invention. A computer according to the collecting sound device with directionality 1 according to an embodiment of the present invention at least comprises: a processing unit 11 such as a CPU or a DSP; a ROM 12; a RAM 13; a communication interface unit 14 capable of data communications with an external computer; a plurality of voice input units 15, 15, . . . for accepting an input of a voice; and a voice output unit 16 for outputting a voice in which noises are suppressed.

The processing unit 11, which is connected with the respective hardware units mentioned above of the collecting sound device with directionality 1 via an internal bus 17, controls the respective hardware units mentioned above and executes various software functions according to process programs stored in the ROM 12, e.g., a program for converting a signal on a time axis for a voice superposed with noises into a signal on a frequency axis, a program for computing an amplitude component of a voice for each detection window of the converted signal on a frequency axis, a program for computing a suppressing function to suppress a signal on a frequency axis based on an amplitude component, a program for computing a phase component of each converted signal on a frequency axis for each frequency, a program for computing a difference of computed phase components between signals on a frequency axis, a program for specifying a probability value indicative of the probability of existence of a sound source in a predetermined direction based on the computed difference of phase components, a program for suppressing a voice input from a sound source other than a sound source in a predetermined direction based on the suppressing function and the probability value, and the like.

The ROM 12, which is constituted of a flash memory or the like, stores process programs necessary for causing the device to function as a collecting sound device with directionality 1. The RAM 13, which is constituted of a SRAM or the like, stores temporary data which is generated in the process of execution of software. The communication interface unit 14 downloads the programs mentioned above from an external computer, transmits and receives a voice output signal to and from a voice recognition device, and the like.

The voice input units 15, 15, . . . are composed of a plurality of microphones for accepting a voice respectively, in order to specify the direction of a sound source. The voice output unit 16 is an output device such as a speaker.

Figure 2:
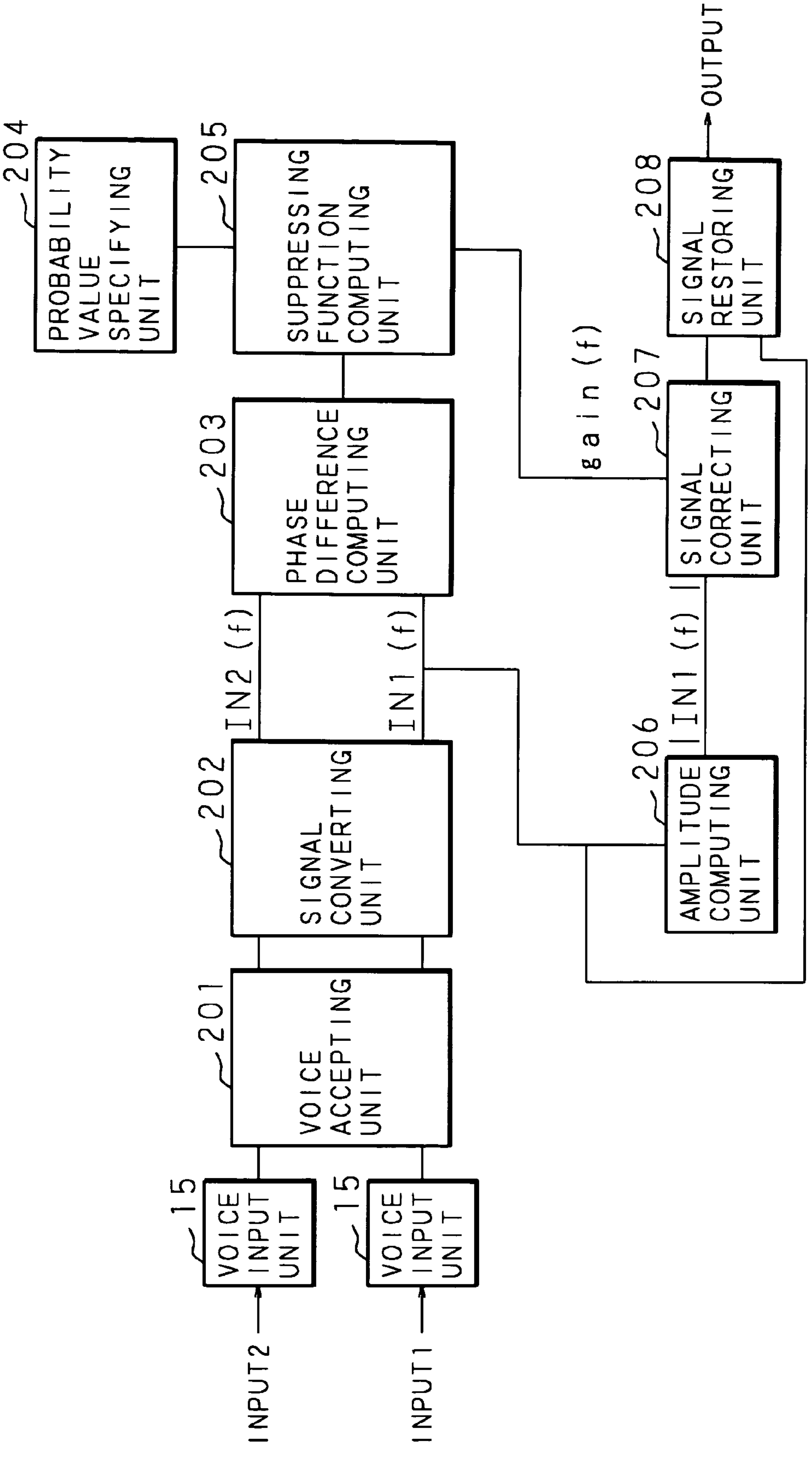
FIG. 2 is a block diagram showing the function structure to be executed by a processing unit of a collecting sound device with directionality according to an embodiment of the present invention.

FIG. 2 is a block diagram showing the function structure to be executed by the processing unit 11 of the collecting sound device with directionality 1 according to an embodiment of the present invention. It should be noted that the example in FIG. 2 explains a case where two microphones are used as the voice input units 15 and 15.

As shown in FIG. 2, the collecting sound device with directionality 1 according to an embodiment of the present invention at least comprises a voice accepting unit 201, a signal converting unit 202, a phase difference computing unit 203, a probability value specifying unit 204, a suppressing function computing unit 205, an amplitude computing unit 206, a signal correcting unit 207 and a signal restoring unit 208. The voice accepting unit 201 accepts a voice input from a plurality of mixed sound sources through the two microphones. In the present embodiment, an input 1 and an input 2 are accepted via the voice input units 15 and 15.

The signal converting unit 202 converts signals on a time axis for an inputted voice into signals on a frequency axis, i.e., spectrums IN1(f) and IN2(f). Here, f denotes frequency. The signal converting unit 202 executes, for example, a time-frequency conversion process such as the Fourier transform, a plurality of band-pass filtering processes such as a sub-band split process, or the like. In the present embodiment, the signals are converted into the spectrums IN1(f) and IN2(f) by a time-frequency conversion process such as the Fourier transform.

Figure 3A:
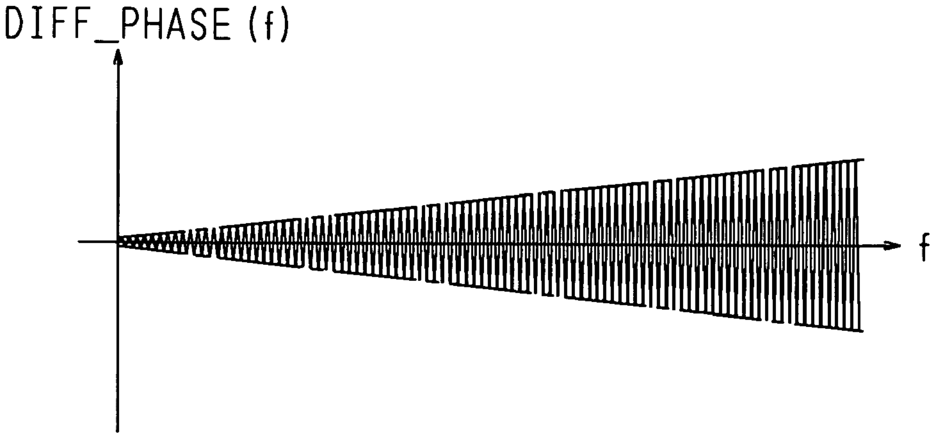
FIGS. 3A and 3B are views schematically showing an example of a phase spectrum difference.
Figure 3B:
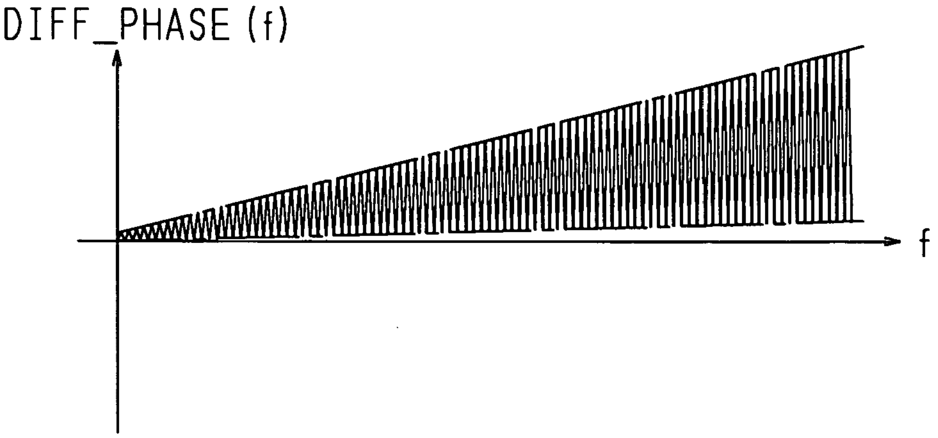

The phase difference computing unit 203 computes phase spectrums based on the spectrums IN1(f) and IN2(f) obtained by the frequency conversion and computes a difference DIFF_PHASE(f) between the computed phase spectrums for each frequency. FIGS. 3A and 3B are views schematically showing an example of the phase spectrum difference DIFF_PHASE(f). FIG. 3A shows an example of a phase spectrum difference DIFF_PHASE(f) of a case where a sound source exists at a position equidistant from the two voice input units 15 and 15, while FIG. 3B shows an example of a phase spectrum difference DIFF_PHASE(f) of a case where a sound source exists at a position biased to a sound source which is to be the standard for computing of DIFF_PHASE(f) of the two voice input units 15 and 15. Mixed in the computed phase spectrum difference DIFF_PHASE(f) are a voice generated from a sound source to be collected and noises generated from other sound sources. Consequently, the phase spectrum difference DIFF_PHASE(f) has a predetermined phase width δ1(f) for each frequency.

The probability value specifying unit 204 specifies a probability value so as to set a high probability value for a direction in which a sound source of a voice to be collected exists. The probability value specifying method is not limited especially. For example, a probability value may be specified as a value for determining at which ratio an input is to be suppressed with distance from the phase width δ1(f) of the phase spectrum difference DIFF_PHASE(f), i.e. as a ratio δ1(f)/δ2(f) of δ1(f) to a separation phase width δ2(f) (δ2(f)>δ1(f)), in order to suppress an input from a sound source existing in a specific direction, i.e., outside the range of the phase width δ1(f) computed for each frequency. In this case, the most suitable value for the separation phase width δ2 fluctuates according to the type of an application for using a voice, the characteristics of a sound source, the ambient environment and the like. Consequently, another input means may be provided to accept an input by the user or a predetermined value may be stored in the RAM 13 by an application to be applied.

Figure 4A:
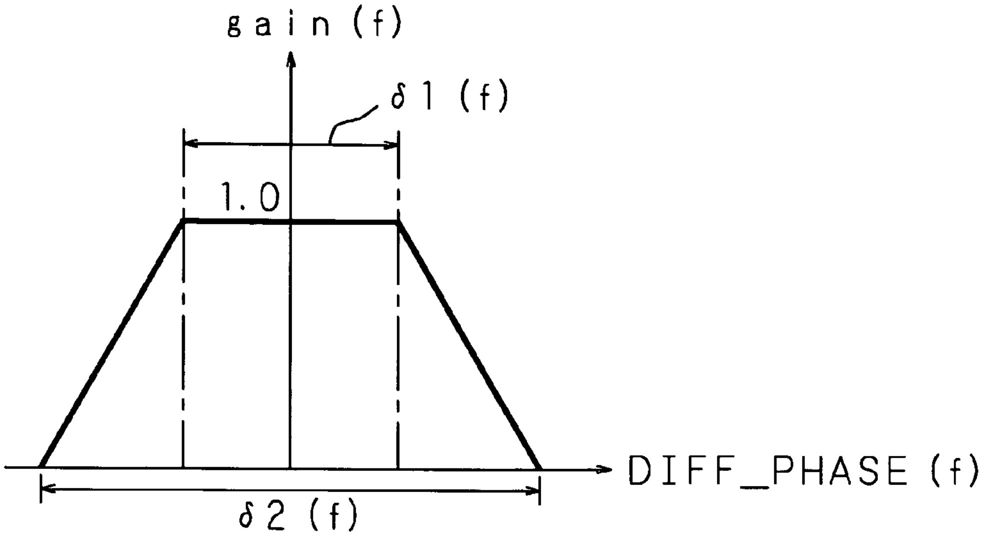
FIGS. 4A and 4B are views showing an example of a suppressing function computed for each frequency.
Figure 4B:
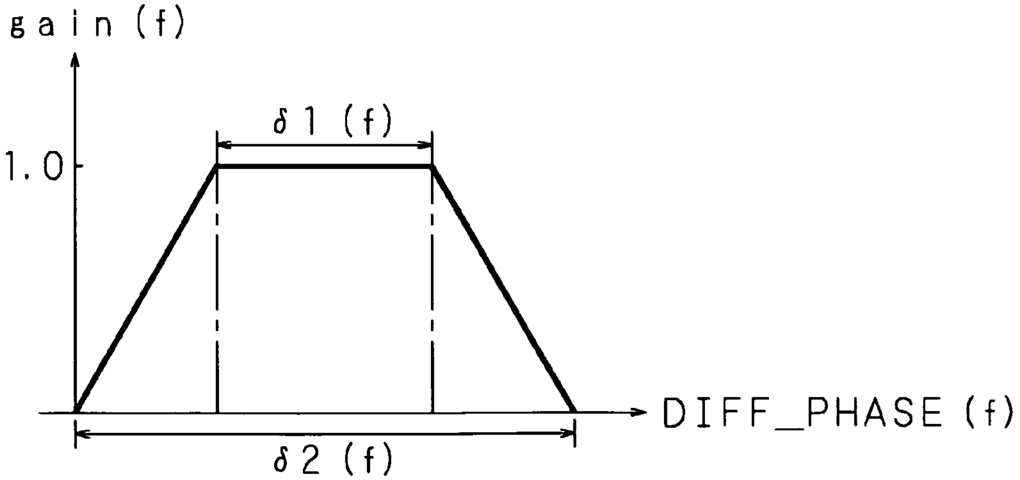

The suppressing function computing unit 205 computes a suppressing function gain(f) for each frequency f based on the phase spectrum difference DIFF_PHASE(f) of the input signal and the probability value δ1(f)/δ2(f). FIGS. 4A and 4B are views showing an example of a suppressing function gain(f) computed for each frequency f. FIG. 4A shows an example of a suppressing function gain(f) of a case where a sound source exists at a position equidistant from the two voice input units 15 and 15, while FIG. 4B shows an example of a suppressing function gain(f) of a case where a sound source exists at a position biased to a sound source which is to be the standard for computing of DIFF_PHASE(f) of the two voice input units 15 and 15.

As shown in FIG. 4A, a separation phase width δ2(f) is computed based on a phase width δ1(f) specified by the phase spectrum difference DIFF_PHASE(f) and the probability value δ1(f)/δ2(f). Since the zone of the phase width δ1(f) corresponds to a direction in which a sound source of a voice input not to be suppressed exists, the suppressing function gain(f) is set to "1".

Since the zone beyond the phase width δ1(f) and within the separation phase width δ2(f) corresponds to a direction in which a sound source to be collected does not exist in principle, the suppressing function gain(f) is set to "0". However, the phase width δ1(f) is subject to an error according to the ambient environment or the like, and an error can also occur when generation of distortion or the like makes it difficult to collect a sound as a natural voice. For this reason, in the present embodiment, linear interpolation is applied to the fluctuation of the suppressing function gain(f) in the zone beyond the phase width δ1(f) and within the separation phase width δ2(f), the suppressing function gain(f) is gradually decreased within the separation phase width δ2(f) and the suppressing function gain(f) is set to "0" at the point of reaching the separation phase width δ2(f). In this manner, it becomes possible to suppress generation of distortion or the like and output a voice proof against a voice recognition process.

In the case in FIG. 4B, a separation phase width δ2(f) is similarly computed based on the phase width δ1(f) specified by the phase spectrum difference DIFF_PHASE(f) and the probability value δ1(f)/δ2(f). In the zone of the phase width δ1(f) corresponding to a direction in which a sound source of a voice input not to be suppressed exists, the suppressing function gain(f) is set to "1". Linear interpolation is applied to the fluctuation of the suppressing function gain(f) in the zone beyond the phase width δ1(f) and within the separation phase width δ2(f), the suppressing function gain(f) is gradually decreased within the separation phase width δ2(f) and the suppressing function gain(f) is set to "0" at the point of reaching the separation phase width δ2(f).

It should be noted that the present invention is not limited to the above technique to apply linear interpolation to the fluctuation of the suppressing function gain(f) in the zone beyond the phase width δ1(f) and within the separation phase width δ2(f) and gradually decrease the suppressing function gain(f) within the separation phase width δ2(f), and any technique, e.g. interpolation by another dimension curve such as quadratic interpolation, stepwise decrease or the like, may be employed as long as a voice generated from a sound source existing in the phase width δ1(f) can be collected.

The amplitude computing unit 206 computes a representative value of an amplitude spectrum |IN1(f)| of a spectrum of an input signal. The representative value is not limited especially, and may be the mean value of the amplitude spectrum |IN1(f)| for each predetermined frequency band or the maximum value for each predetermined frequency band. In addition, a process using not a representative value but a value for each frequency may also be employed.

Figure 5:
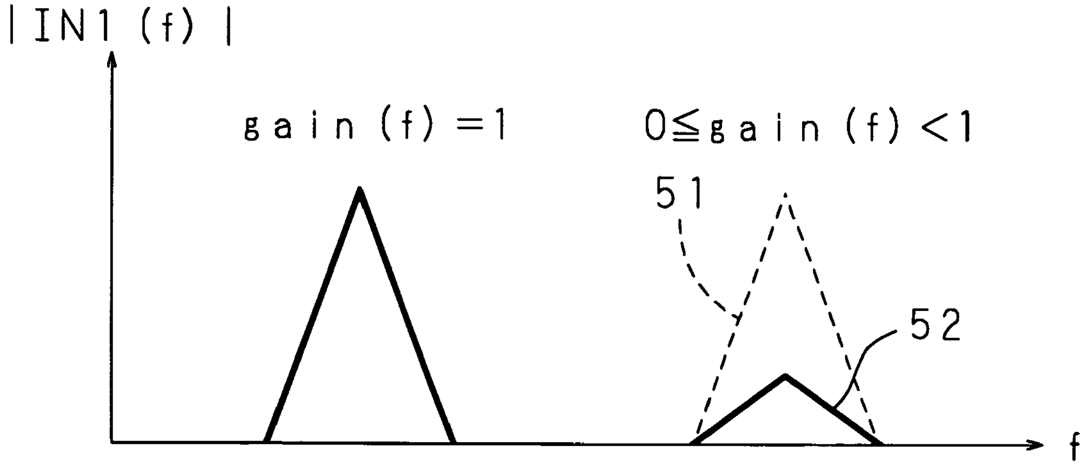
FIG. 5 is a view schematically showing an example of result obtained by multiplying an amplitude spectrum by a suppressing function.

The signal correcting unit 207 multiplies the amplitude spectrum |IN1(f)| 1 computed by the amplitude computing unit 206 by the suppressing function gain(f) computed by the suppressing function computing unit 205. FIG. 5 is a view schematically showing an example of result obtained by multiplying an amplitude spectrum |IN1(f)| by a suppressing function gain(f). As shown in FIG. 5, when the suppressing function gain(f) is "1", the amplitude spectrum |IN1(f)| is outputted without modification. When the suppressing function gain(f) satisfies $0 \leqq \text{gain(f)} \leqq 1$, output is respectively suppressed with the suppressing function gain(f). That is, the amplitude spectrum 51 shown in broken lines is suppressed to be the amplitude spectrum 52 shown in continuous lines.

The signal restoring unit 208 converts an output signal from the signal correcting unit 207 into a signal on a time axis and outputs the signal. The process in the signal restoring unit 208 is an inversion process of the signal converting unit 202. For example, when the Fourier transform (FFT) process is executed in the signal converting unit 202, the signal restoring unit 208 executes the inverse Fourier transform (IFFT).

Figure 6:
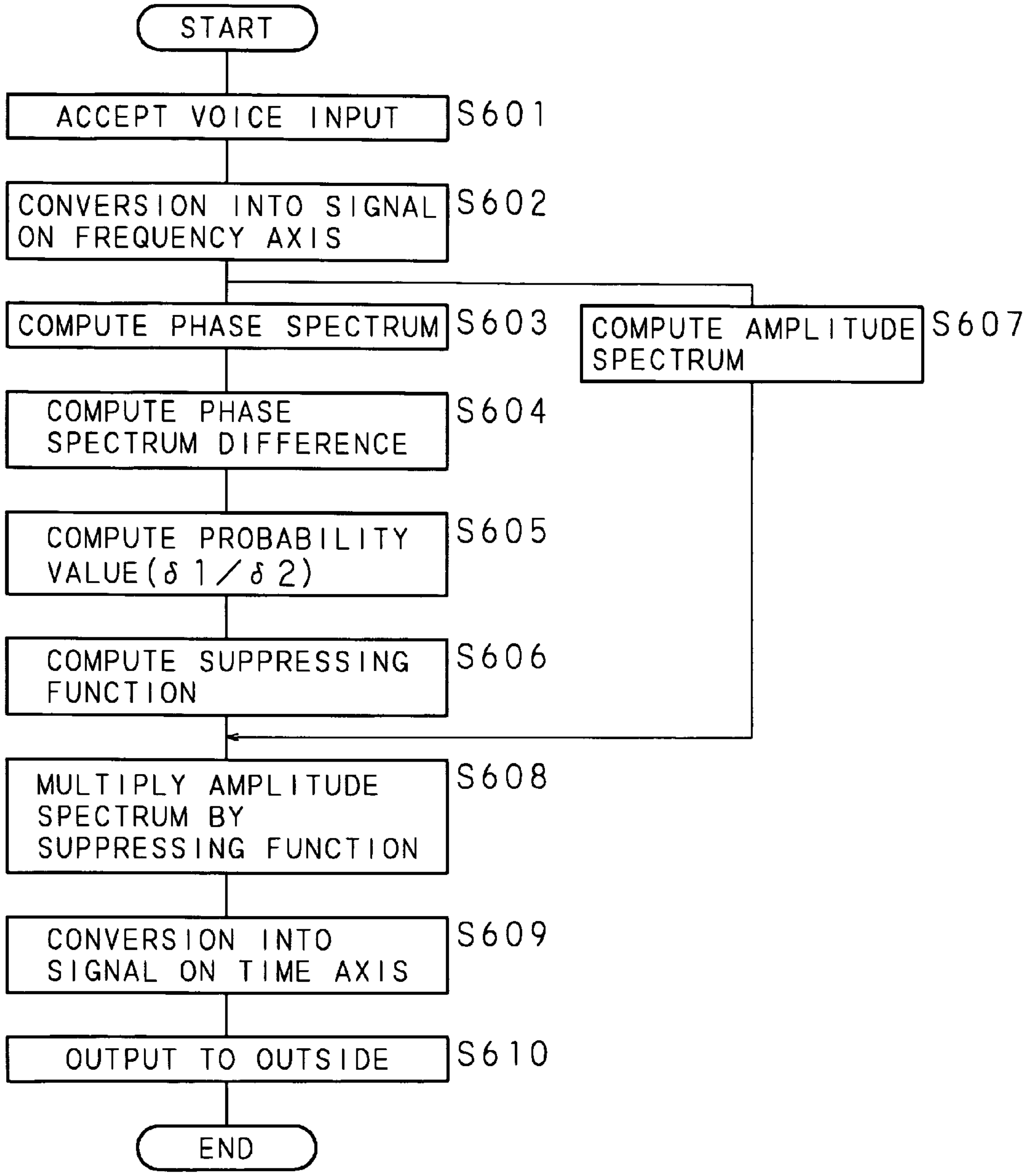
FIG. 6 is a flow chart showing the process procedure of a processing unit of a collecting sound device with directionality according to an embodiment of the present invention.

FIG. 6 is a flow chart showing the process procedure of the processing unit 11 of the collecting sound device with directionality 1 according to an embodiment of the present invention. The processing unit 11 of the collecting sound device with directionality 1 accepts a voice input (step S601) and converts the voice input into signals on a frequency axis, i.e. into spectrums IN1(f) and IN2(f) (step S602), by the Fourier transform, for example. Here, f denotes frequency.

The processing unit 11 computes phase spectrums based on the spectrums IN1(f) and IN2(f) obtained by frequency conversion (step S603) and computes a difference DIFF_PHASE(f) between the computed phase spectrums for each frequency (step S604).

The processing unit 11 specifies a probability value so as to set a high probability value for a direction in which a sound source of a voice to be collected exists (step S605). The probability value specifying method is not limited especially, although a probability value is specified here as a value for determining at which ratio an input is to be suppressed with distance from the phase width δ1(f) of the phase spectrum difference DIFF_PHASE(f), i.e., as a ratio δ1(f)/δ2(f) of δ1(f) to a separation phase width δ2(f) (δ2(f)>δ1(f)).

The processing unit 11 computes a suppressing function gain(f) for each frequency f based on the phase spectrum difference DIFF_PHASE(f) and the probability value δ1(f)/δ2(f) (step S606). The processing unit 11 computes an amplitude spectrum |IN1(f)| (step S607) and multiplies the amplitude spectrum |IN1(f)| by a suppressing function gain(f) computed by the suppressing function computing unit 205 (step S608).

The processing unit 11 converts the signal obtained by multiplication into a signal on a time axis (step S609) and outputs the signal to an external application, e.g., a voice recognition device (step S610). When the Fourier transform has been applied, the signal can be restored to a signal on a time axis by applying the inverse Fourier transform.

With the present embodiment, as described above, even when a plurality of sound sources exist, it becomes possible to suppress output for a sound input from a sound source existing in a direction other than a predetermined direction as noises and enhance only a sound input from a sound source to be collected.

For example, when the collecting sound device with directionality 1 according to the present embodiment is applied to a car navigation system whose operation is controlled with voice, the voice input from a microphone (voice input unit 15) closer to the driver is employed as an output of sound collection with directionality and the voice input from a microphone (voice input unit 15) closer to the passenger seat is suppressed in order to reliably collect voice of the driver who mainly operates the system. Consequently, even when the driver and the passenger speak at the same time, it becomes possible to employ only the voice of the driver as an output of sound collection with directionality and prevent malfunction of the car navigation system due to false recognition of a voice input.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A collecting sound device with directionality comprising:

a plurality of voice accepting means for accepting a sound input from sound sources existing in a plurality of directions and converting the sound input into a signal on a time axis;

signal converting means for converting each signal on a time axis into a signal on a frequency axis;

phase component computing means for computing a phase component of each signal on a frequency axis converted by the signal converting means for each frequency;

phase difference computing means for computing a difference of phase components between signals on a frequency axis computed by the phase component computing means;

probability value specifying means for specifying a probability value indicative of probability of existence of a sound source in a predetermined direction based on the difference of phase components computed by the phase difference computing means;

suppressing function computing means for computing a suppressing function to suppress a sound input from a sound source other than a sound source in a predetermined direction based on the probability value specified by the probability value specifying means, whereby the suppressing function is a function of the difference of phase components computed by the phase difference computing means;

signal correcting means for multiplying an amplitude component of a signal on a frequency axis by the computed suppressing function and correcting the converted signal on a frequency axis;

signal restoring means for restoring the corrected signal on a frequency axis to a signal on a time axis; and means for computing a separation phase width corresponding to a range of the phase component, for which a sound input from a sound source other than a sound source in a predetermined direction needs to be suppressed, based on the probability value specified by the probability value specifying means; wherein a width of the phase difference in which a sound source exists in a predetermined direction is set for each frequency based on the computed difference of phase components by the phase difference computing means, and the suppressing function is set to 1 within the range of the set width of the phase difference; and wherein the suppressing function is set to 1 in the phase width and set as a positive real number which gradually decreases with distance from the phase width and becomes 0 in a range beyond the computed separation phase width.

2. The collecting sound device with directionality according to claim 1, wherein the probability value specifying means specifies a probability value for each frequency independently and the suppressing function computing means computes a suppressing function for each frequency independently.

3. A collecting sound device with directionality comprising a processor capable of performing the steps of accepting a sound input from sound sources existing in a plurality of directions;

converting the sound input into a signal on a time axis;

converting each signal on a time axis into a signal on a frequency axis;

computing a phase component of each converted signal on a frequency axis for each frequency;

computing a difference of computed phase components between signals on a frequency axis;

specifying a probability value indicative of probability of existence of a sound source in a predetermined direction based on the computed difference of phase components;

computing a suppressing function to suppress a sound input from a sound source other than a sound source in a predetermined direction based on the specified probability value, whereby the suppressing function is a function of the difference of computed phase components;

multiplying an amplitude component of a signal on a frequency axis by the computed suppressing function and correcting the converted signal on a frequency axis;

restoring the corrected signal on a frequency axis to a signal on a time axis;

determining whether the computed difference of phase components is within a predetermined range or not;

computing a separation phase width corresponding to a range of the phase component, for which a sound input from a sound source other than a sound source in a predetermined direction needs to be suppressed, based on the probability value specified by the probability value specifying means;

setting a width of the phase difference in which a sound source exists in a predetermined direction for each frequency based on the computed difference of phase components by the phase difference computing means, and setting the suppressing function to 1 within the range of the set width of the phase difference; and setting the suppressing function to 1 in the phase width and set as a positive real number which gradually decreases with distance from the phase width and becomes 0 in a range beyond the computed separation phase width.

4. A collecting sound method with directionality comprising the steps of accepting a sound input from sound sources existing in a plurality of directions;

converting the sound input into a signal on a time axis;

converting each signal on a time axis into a signal on a frequency axis;

computing a phase component of each converted signal on a frequency axis for each frequency;

computing a difference of computed phase components between signals on a frequency axis;

specifying a probability value indicative of probability of existence of a sound source in a predetermined direction based on the computed difference of phase components;

computing a suppressing function to suppress a sound input from a sound source other than a sound source in a predetermined direction based on the specified probability value, whereby the suppressing function is a function of the difference of computed phase components;

multiplying an amplitude component of a signal on a frequency axis by the computed suppressing function and correcting the converted signal on a frequency axis;

restoring the corrected signal on a frequency axis to a signal on a time axis;

determining whether the computed difference of phase components is within a predetermined range or not;

computing a separation phase width corresponding to a range of the phase component, for which a sound input from a sound source other than a sound source in a predetermined direction needs to be suppressed, based on the probability value specified by the probability value specifying means;

setting a width of the phase difference in which a sound source exists in a predetermined direction for each frequency based on the computed difference of phase components by the phase difference computing means, and setting the suppressing function to 1 within the range of the set width of the phase difference; and setting the suppressing function to 1 in the phase width and set as a positive real number which gradually decreases with distance from the phase width and becomes 0 in a range beyond the computed separation phase width.

5. The collecting sound method with directionality according to claim 4, comprising specifying, a probability value for each frequency independently and computing a suppressing function for each frequency independently.

6. A memory product storing a computer program, wherein the computer program comprises the steps of causing a computer to accept a sound input from sound sources existing in a plurality of directions;

causing a computer to convert the sound input into a signal on a time axis;

causing a computer to convert each signal on a time axis into a signal on a frequency axis;

causing a computer to compute a phase component of each converted signal on a frequency axis for each frequency;

causing a computer to compute a difference of computed phase components between signals on a frequency axis;

causing a computer to specify a probability value indicative of probability of existence of a sound source in a predetermined direction based on the computed difference of phase components;

causing a computer to compute a suppressing function to suppress a sound input from a sound source other than a sound source in a predetermined direction based on the specified probability value, whereby the suppressing function is a function of the difference of computed phase components;

causing a computer to multiply an amplitude component of a signal on a frequency axis by the computed suppressing function and correct the converted signal on a frequency axis;

causing a computer to restore the corrected signal on a frequency axis to a signal on a time axis;

causing a computer to suppress a sound input from a sound source other than a sound source in a predetermined direction;

causing a computer to determine whether the computed difference of phase components is within a predetermined range or not;

causing a computer to compute a separation phase width corresponding to a range of the base component, for which a sound input from a sound source other than a sound source in a predetermined direction needs to be suppressed, based on the probability value specified by the probability value specifying means;

causing a computer to set a width of the phase difference in which a sound source exists in a predetermined direction for each frequency based on the computed difference of phase components by the phase difference computing means, and setting the suppressing function to 1 within the range of the set width of the phase difference; and causing a computer to set the suppressing function to 1 in the phase width and set as a positive real number which gradually decreases with distance from the phase width and becomes 0 in a range beyond the computed separation phase width.

7. The memory product storing a computer program according to claim 6, wherein the computer program comprises the steps of specifying a probability value for each frequency independently and computing a suppressing function for each frequency independently.

* * * * *